US00RE44585E

(19) United States
(12) Reissued Patent
Rohrer

(10) Patent Number: US RE44,585 E
(45) Date of Reissued Patent: Nov. 12, 2013

(54) SALAD CUTTER

(75) Inventor: Jeffrey S. Rohrer, Kewaskum, WI (US)

(73) Assignee: Regal Ware, Inc., Kewaskum, WI (US)

(21) Appl. No.: 29/315,487

(22) Filed: Jun. 4, 2009

Related U.S. Patent Documents

Reissue of:
(64) Patent No.: Des. 543,774
Issued: Jun. 5, 2007
Appl. No.: 29/221,490
Filed: Jan. 14, 2005

(51) LOC (9) Cl. ..... 31-00
(52) U.S. Cl.
USPC ..... D7/381
(58) Field of Classification Search
USPC ..... D7/368, 372–373, 376–386, 399, D7/412–414, 665; 99/377, 509–511, 645; 241/30–37.5, 82, 82.1, 82.6, 92, 93, 241/101.01–2, 166, 169.1, 273.2, 273.3, 241/274–278.2, 285.1–285.3, 291, 292.1; 366/24–254, 279–292, 341–343, 366/325.941
See application file for complete search history.

(56) References Cited

U.S. PATENT DOCUMENTS

| | | | |
|---|---|---|---|
| 344,046 | A | 6/1886 | Holmes |
| 399,587 | A | 3/1889 | Warren |
| 419,103 | A | 1/1890 | Baltzley |
| 859,368 | A | 7/1907 | Collins |
| 913,187 | A | 2/1909 | Arnstein |
| 1,032,258 | A | 7/1912 | Wefing |
| 1,114,411 | A | 10/1914 | Stuver |
| 1,133,443 | A | 3/1915 | Martin |
| D56,561 | S | 11/1920 | Larsen |
| 1,373,843 | A | 4/1921 | Sundberg |
| 1,669,092 | A | 5/1928 | Kools |
| 1,738,896 | A | 12/1929 | Hansen |
| 1,780,173 | A | 11/1930 | Crowe |
| 1,840,400 | A | 1/1932 | Lebherz |
| 1,928,718 | A | 10/1933 | Covey |

(Continued)

FOREIGN PATENT DOCUMENTS

| | | |
|---|---|---|
| CA | 1270657 | 6/1990 |
| CA | 2131876 | 9/2002 |

(Continued)

OTHER PUBLICATIONS

Complaint filed in *HyCite* v. *Regal Ware, Inc.*, Case No. 10-CV-168, dated Mar. 29, 2010, 31 pages.

(Continued)

*Primary Examiner* — Phillip S Hyder
(74) *Attorney, Agent, or Firm* — Ryan Kromholz & Manion, S.C.

(57) CLAIM

The ornamental design for a salad cutter, as shown and described.

DESCRIPTION

FIG. 1 is a right, front perspective view of the salad cutter of the present invention;
FIG. 2 is a right side view thereof;
FIG. 3 is a left side view thereof;
FIG. 4 is a rear side view thereof;
FIG. 5 is a front side view thereof;
FIG. 6 is a top view thereof; and,
FIG. 7 is a bottom view thereof.
The broken lines shown in the drawings are for illustrative purposes only and form no part of the claimed design.

1 Claim, 3 Drawing Sheets

Figure 1:
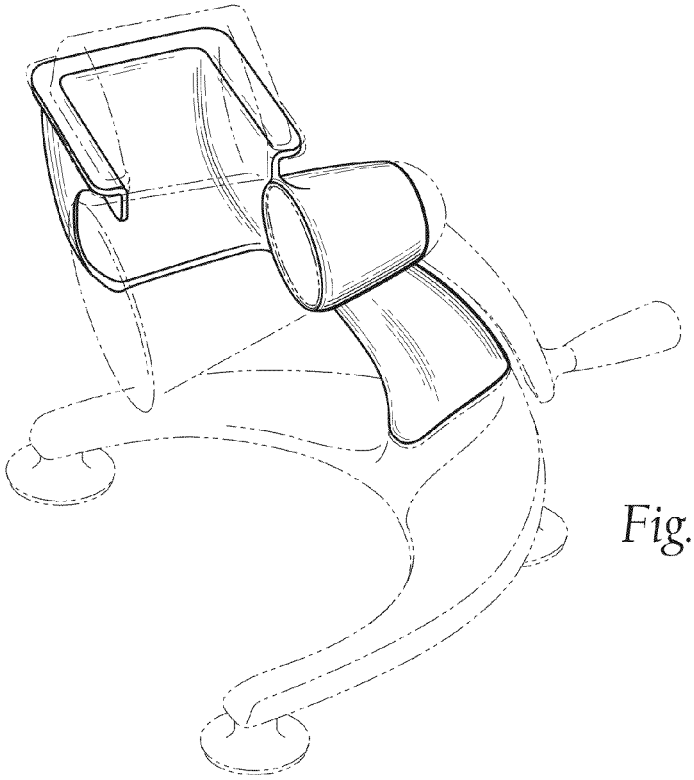
Figure 2:
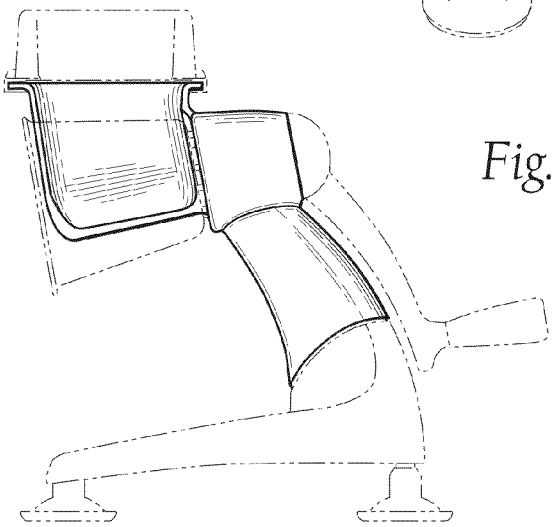
Figure 3:
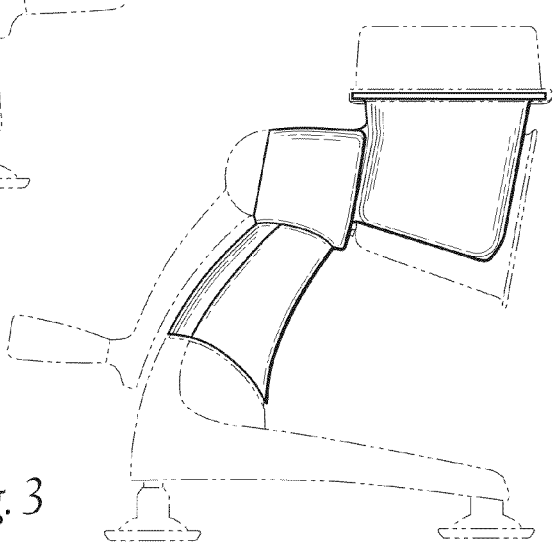
Figure 5:
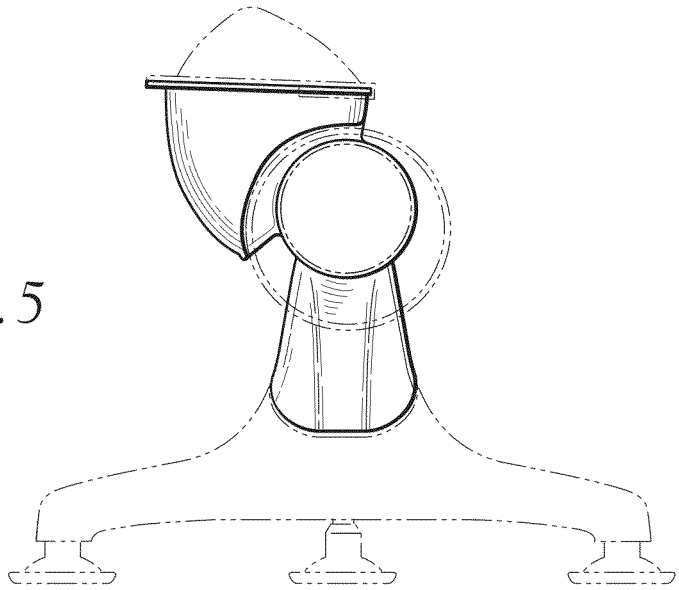
Figure 7:
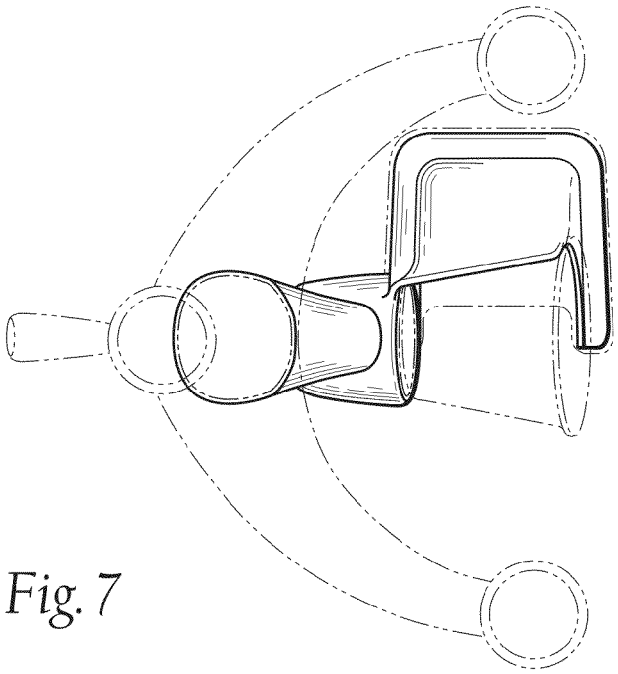

Matter enclosed in heavy brackets [ ] appears in the original patent but forms no part of this reissue; matter printed in italics indicates the additions made by reissue.

(56) References Cited

U.S. PATENT DOCUMENTS

| | | | |
|---|---|---|---|
| 1,942,766 | A | 2/1934 | O'Banion |
| 2,145,421 | A | 1/1939 | Jungbecker |
| 2,228,175 | A | 1/1941 | Miller |
| D156,557 | S | 12/1949 | Piker |
| 2,596,604 | A | 5/1952 | Schaeffer |
| D173,029 | S | 9/1954 | Green et al. |
| 2,695,643 | A | 11/1954 | Aberer |
| 2,713,367 | A | 7/1955 | Aberer |
| D187,452 | S | 3/1960 | Mango |
| 2,945,298 | A | 7/1960 | Guttmann |
| 2,958,355 | A | 11/1960 | Young |
| 3,115,171 | A | 12/1963 | Loveland |
| 3,138,823 | A | 6/1964 | Langner |
| D201,602 | S | 7/1965 | Graham |
| D206,927 | S | 2/1967 | Pompeil |
| 3,353,266 | A | 11/1967 | Goolsby |
| D215,390 | S | 9/1969 | McGee |
| D217,691 | S | 5/1970 | Earp |
| D219,358 | S | 12/1970 | Popeli |
| 3,610,304 | A | 10/1971 | Popeil et al. |
| 3,664,021 | A | 5/1972 | Sawyer |
| 3,710,445 | A | 1/1973 | Roth |
| 3,711,945 | A | 1/1973 | Cronheim |
| 3,713,378 | A | 1/1973 | West et al. |
| 3,772,737 | A | 11/1973 | Fleiss |
| D233,123 | S | 10/1974 | Rigamonti |
| 3,912,176 | A | 10/1975 | Mantelet |
| 3,996,846 | A | 12/1976 | Hupf |
| 4,081,145 | A | 3/1978 | Moe et al. |
| 4,100,677 | A | 7/1978 | Jeff |
| 4,134,358 | A | 1/1979 | Heermans |
| D253,155 | S | 10/1979 | Jurida |
| 4,199,841 | A | 4/1980 | Jaccard |
| 4,254,700 | A | 3/1981 | Fleming |
| 4,258,657 | A | 3/1981 | Fritz |
| D260,129 | S | 8/1981 | Shun |
| D260,351 | S | 8/1981 | Shun |
| D261,472 | S | 10/1981 | Graham et al. |
| 4,295,272 | A | 10/1981 | Kubota |
| 4,418,637 | A | 12/1983 | Heermans |
| 4,437,237 | A | 3/1984 | Ducret |
| 4,463,476 | A | 8/1984 | Jaccard |
| D276,202 | S | 11/1984 | Shun |
| 4,534,858 | A | 8/1985 | Aldrich et al. |
| 4,606,823 | A | 8/1986 | Lucas, III |
| 4,667,085 | A | 5/1987 | Remmel et al. |
| 4,669,275 | A | 6/1987 | Ohgushi et al. |
| 4,674,154 | A | 6/1987 | Gilbert et al. |
| 4,681,000 | A | 7/1987 | Wolters |
| RE32,501 | E | 9/1987 | Okada |
| D297,390 | S | 8/1988 | Fehrmann |
| 4,776,092 | A | 10/1988 | Moores et al. |
| 4,776,296 | A | 10/1988 | Heermans |
| 4,848,001 | A | 7/1989 | Clark et al. |
| 4,862,552 | A | 9/1989 | Remmel |
| 4,972,769 | A | 11/1990 | Cailliot |
| 5,023,927 | A | 6/1991 | Bardell |
| 5,144,749 | A | 9/1992 | Chen |
| D344,213 | S | 2/1994 | Johns |
| 5,355,588 | A | 10/1994 | Brandenburg, Jr. et al. |
| 5,400,512 | A | 3/1995 | Brush |
| 5,463,942 | A | 11/1995 | Hupf et al. |
| D365,971 | S | 1/1996 | Brockmann |
| 5,493,781 | A | 2/1996 | Saito |
| D369,718 | S | 5/1996 | Rohrer |
| 5,531,095 | A | 7/1996 | Hupf |
| D372,634 | S | 8/1996 | Rohrer |
| D376,726 | S | 12/1996 | Rohrer |
| D377,581 | S | 1/1997 | Rohrer |
| D383,192 | S | 9/1997 | Johnson |
| 5,670,216 | A | 9/1997 | Oak et al. |
| 5,698,769 | A | 12/1997 | Hupf |
| 5,765,289 | A | 6/1998 | Schulz et al. |
| 5,765,431 | A | 6/1998 | Hupf |
| 5,787,779 | A | 8/1998 | Garuglieri |
| D401,815 | S | 12/1998 | Filipovic |
| D403,918 | S | 1/1999 | Lin |
| D414,383 | S | 9/1999 | Fitzgibbons et al. |
| 6,004,000 | A | 12/1999 | Hupf et al. |
| D424,889 | S | 5/2000 | Yip |
| 6,080,496 | A | 6/2000 | Hupf et al. |
| 6,094,824 | A | 8/2000 | Takeshita |
| 6,209,750 | B1 | 4/2001 | Remmel |
| 6,260,733 | B1 | 7/2001 | Eimerman |
| 6,282,794 | B1 | 9/2001 | Cho et al. |
| D475,253 | S | 6/2003 | Yip |
| D484,738 | S | 1/2004 | Wong |
| D496,824 | S | 10/2004 | Meshes |
| D507,455 | S | 7/2005 | Bertulis |
| D531,850 | S | 11/2006 | Wong |
| D543,774 | S | 6/2007 | Rohrer |
| 7,337,997 | B2 | 3/2008 | Ko |
| D597,785 | S | 8/2009 | Rohrer |

FOREIGN PATENT DOCUMENTS

| | | |
|---|---|---|
| CH | 642245 | 4/1984 |
| DE | 611489 | 3/1935 |
| DE | 9003291 | 7/1990 |
| IT | 573580 | 2/1958 |
| KR | 105515 | 10/1996 |
| WO | WO 97/24469 | 7/1997 |

OTHER PUBLICATIONS

Motion to Dismiss Complaint and to Strike Portions of Plaintiff's Complaint filed in *HyCite* v. *Regal Ware, Inc.* Case No. 10-CV-168, dated Apr. 20, 2010, 50 pages.

USPTO Notice of Allowance dated Apr. 3, 2009 regarding U.S. Appl. No. 29/288,267, 6 pages.

USPTO Office Action dated Nov. 17, 2008 regarding U.S. Appl. No. 29/288,267, 9 pages. Amendment A dated Feb. 17, 2009 regarding same case, 3 pages.

Amendment A dated Feb. 17, 2009 regarding U.S. Appl. No. 29/288,267, 3 pages.

USPTO Notice of Allowance dated Dec. 23, 2009 regarding U.S. Appl. No. 29/314,290, 7 pages.

Transmittal of New Drawings dated Mar. 9, 2007 regarding U.S. Appl. No. 29/221,490, 4 pages.

USPTO Notice of Allowance dated Dec. 13, 2009 regarding U.S. Appl. No. 29/221,490, 7 pages.

Amendment After Allowance dated Jan. 15, 2007 regarding U.S. Appl. No. 29/221,490, 2 pages.

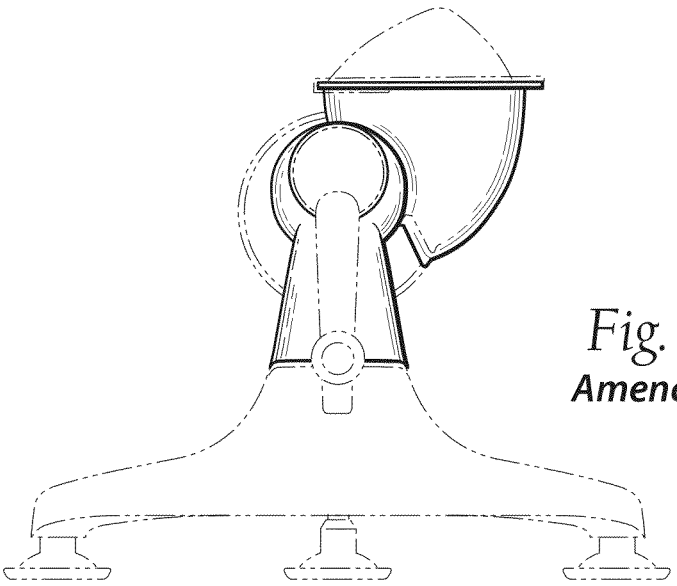
Fig. 4
Amended

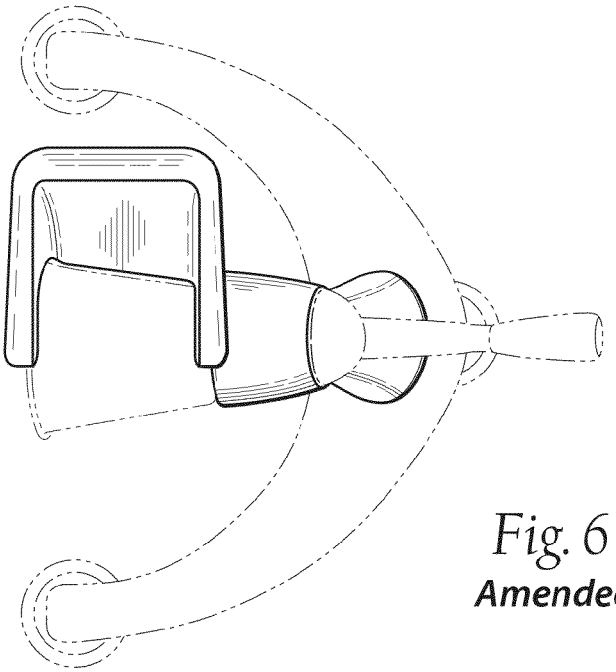
Fig. 6
Amended